(12) United States Patent
Meng

(10) Patent No.: US 9,964,924 B2
(45) Date of Patent: May 8, 2018

(54) HOLOGRAPHIC 3D RECORDING DEVICE, REPRODUCING DEVICE AND DISPLAY APPARATUS

(71) Applicants: BOE Technology Group Co., Ltd., Beijing (CN); Beijing BOE Chatani Electronics Co., Ltd., Beijing (CN)

(72) Inventor: Yingli Meng, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 0 days. days.

(21) Appl. No.: 15/122,307

(22) PCT Filed: Aug. 28, 2015

(86) PCT No.: PCT/CN2015/085290
§ 371 (c)(1),
(2) Date: Aug. 29, 2016

(87) PCT Pub. No.: WO2016/155167
PCT Pub. Date: Oct. 6, 2016

(65) Prior Publication Data
US 2017/0075303 A1    Mar. 16, 2017

(30) Foreign Application Priority Data
Mar. 27, 2015  (CN) .......................... 2015 1 0142289

(51) Int. Cl.
*G03H 1/00* (2006.01)
*G03H 1/04* (2006.01)
(Continued)

(52) U.S. Cl.
CPC ........... *G03H 1/041* (2013.01); *G02B 3/0006* (2013.01); *G02B 27/22* (2013.01); *G03H 1/02* (2013.01);
(Continued)

(58) Field of Classification Search
CPC . G02F 1/1313; G02F 1/11; G02F 1/33; G02F 1/292; G02F 1/2955; G02F 1/31;
(Continued)

(56) References Cited

U.S. PATENT DOCUMENTS 5,569,565 A    10/1996  Kawakami et al.
6,281,994 B1    8/2001  Horikoshi et al.
(Continued)

FOREIGN PATENT DOCUMENTS

CN    1159046 A    9/1997
CN    1632448 A    6/2005
(Continued)

OTHER PUBLICATIONS

International Search Report and Written Opinion, including English translation of Box No. V, for International Application No. PCT/CN2015/085290, dated Dec. 22, 2015, 11 pages.
(Continued)

*Primary Examiner* — Jennifer L. Doak
(74) *Attorney, Agent, or Firm* — Westman, Champlin & Koehler, P.A.

(57) ABSTRACT

A holographic 3D recording device includes: a photorefractive crystal and a microlens array. The microlens array includes an array face and a side face. The microlens array is provided in a light path from an object to be photographed to the photorefractive crystal such that first light of object emitted through a diffuse reflection of the object to be photographed passes through the array face of the microlens array and becomes second light of object that is emitted to
(Continued)

the photorefractive crystal. The photorefractive crystal is configured to receive the second light of object emitted by the microlens array and reference light, respectively, and save therein an interference fringe formed by the reference light and the second light of object. The first light of object and the reference light are coherent light.

19 Claims, 5 Drawing Sheets

(51) Int. Cl.
*G02B 27/22* (2018.01)
*G02B 3/00* (2006.01)
*G03H 1/02* (2006.01)
*G03H 1/22* (2006.01)

(52) U.S. Cl.
CPC ......... *G03H 1/0465* (2013.01); *G03H 1/2205* (2013.01); *G03H 2001/0268* (2013.01); *G03H 2001/0469* (2013.01); *G03H 2001/2226* (2013.01); *G03H 2210/30* (2013.01); *G03H 2222/53* (2013.01); *G03H 2223/14* (2013.01); *G03H 2223/17* (2013.01); *G03H 2223/19* (2013.01); *G03H 2223/20* (2013.01); *G03H 2223/22* (2013.01); *G03H 2223/24* (2013.01)

(58) Field of Classification Search
CPC .... G03B 21/006; H04N 9/3105; G02B 27/01; G02B 27/0101; G02B 2027/0112; G02B 27/017; G02B 27/0172; G02B 5/1828; G02B 26/0808
See application file for complete search history.

(56) References Cited

U.S. PATENT DOCUMENTS

| | | | |
|---|---|---|---|
| 9,229,430 B2 | 1/2016 | Zheng et al. | |
| 2003/0156309 A1* | 8/2003 | Zgonik | G03H 1/0248 359/35 |
| 2004/0061934 A1 | 4/2004 | Lee et al. | |
| 2004/0190094 A1* | 9/2004 | Kawano | G11B 7/0065 359/11 |
| 2006/0279823 A1* | 12/2006 | Riley | G11B 7/0065 359/22 |
| 2009/0225381 A1 | 9/2009 | Olaya et al. | |
| 2014/0293385 A1* | 10/2014 | Smithwick | G03H 1/26 359/9 |
| 2015/0378307 A1 | 12/2015 | Zheng et al. | |

FOREIGN PATENT DOCUMENTS

| | | |
|---|---|---|
| CN | 103064275 A | 4/2013 |
| CN | 103365196 A | 10/2013 |
| CN | 104714392 A | 6/2015 |
| SU | 1104362 A | 7/1984 |

OTHER PUBLICATIONS

First Office Action, including Search Report, for Chinese Patent Application No. 201510142289.5, dated Nov. 7, 2016, 23 pages.

\* cited by examiner

HOLOGRAPHIC 3D RECORDING DEVICE, REPRODUCING DEVICE AND DISPLAY APPARATUS

CROSS-REFERENCE TO RELATED APPLICATION

This application is a Section 371 National Stage Application of International Application No. PCT/CN2015/085290, filed on 28 Jul. 2015, and entitled "Holographic 3D Recording Device, Reproducing Device and Display Apparatus", which claims priority to Chinese Patent Application No. 201510142289.5 filed on Mar. 27, 2015 in the State Intellectual Property Office of China, the disclosures of which are incorporated herein by their reference.

BACKGROUND

1. Technical Field

Embodiments of the present application relate to the field of display technology, and particularly to a holographic 3D recording device, a reproducing device and a display apparatus.

2. Description of the Related Art

Holography refers to all information of a light wave, namely amplitude and phase information of the light wave. Common photography can only record intensity (namely, amplitude) information of a light wave while losing phase information of the light wave. Interference principle is utilized in the holography to save all information (namely amplitude and phase information) of an original light wave of an object in a recording medium. According to the principle of diffraction, the original light wave will be reproduced when the recording medium is irradiated by a reproducing light wave, to reproduce a lively stereoscopic image. The object image reproduced by the holography has strong stereoscopic sense, and accordingly, holography-based 3D display receives more and more people's attentions.

A holographic 3D display apparatus is disclosed in prior art, and this apparatus comprises a recording device and a reproducing device. The recording device, as shown in FIG. 1, comprises a laser generating unit 1, a beam splitting unit 2 and a photorefractive crystal 3. The photorefractive crystal 3 is mounted at a certain angle firstly, and, the recording device can only record light wave information from diffuse reflection of the object 100 to be photographed at a corresponding angle. In order to record relatively complete light wave information from diffuse reflection of the object 100 to be photographed, the photorefractive crystal 3 is required to be rotated to various angles, so that light wave information from diffuse reflection of the object 100 to be photographed at various angles can be recorded, so as to record the object more realistically. That is, the photorefractive crystal 3 is required to be rotated to different angles when the recording device implements a record of a holographic 3D image, in order to achieve the record of the holographic 3D image. The photorefractive crystal 3 is also required to be rotated when the reproducing device implements a reproduction of a holographic 3D image, in order to achieve the reproduction of the holographic 3D image. As a result, an angle controller is required to be added into the holographic 3D display apparatus, so that implementations of recording and reproducing a holographic 3D image are achieved only after implementing many rotations of the photorefractive crystal, which raises complexity of the implementations of recording and reproducing the holographic 3D image.

SUMMARY

In some embodiments of the present application, there provides a holographic 3D recording device comprising: a photorefractive crystal and a microlens array. The microlens array comprises an array face and a side face. The microlens array is provided in a light path from an object to be photographed to the photorefractive crystal, and a first light of object emitted from diffuse reflection of the object to be photographed passes through the array face of the microlens array and becomes a second light of object that is emitted to the photorefractive crystal. The photorefractive crystal is configured to receive the second light of object emitted by the microlens array and a reference light, respectively, and save an interference fringe formed of the reference light and the second light of object. The first light of object and the reference light are coherent light.

In some embodiments of the present application, there provides a holographic 3D reproducing device, comprising a photorefractive crystal and a microlens array. The microlens array comprises an array face and a side face. The photorefractive crystal is configured to receive a reference light; the reference light diffracts with an interference fringe saved in the photorefractive crystal, to form a reproducing light wave, that is emitted to the microlens array, of a holographic 3D image corresponding to the interference fringe. The microlens array is configured to receive a reproducing light wave emitted by the photorefractive crystal; the reproducing light wave passes through the array face of the microlens array, to reproduce the holographic 3D image.

In some embodiments of the present application, there provides a holographic 3D display apparatus (for short, display apparatus) comprising a photorefractive crystal and a microlens array. The microlens array comprises an array face and a side face. In the case that the display apparatus is for implementing a holographic 3D record, the microlens array is provided in a light path from an object to be photographed to the photorefractive crystal, and a first light of object emitted from diffuse reflection of the object to be photographed passes through the array face of the microlens array and becomes a second light of object that is emitted to the photorefractive crystal; the photorefractive crystal is configured to receive the second light of object emitted by the microlens array and a reference light, respectively, and save an interference fringe formed of the reference light and the second light of object; and, the first light of object and the reference light are coherent light; and, the first light of object and the reference light are coherent light. In the case that the display apparatus is for implementing a holographic 3D reproduction, the photorefractive crystal is configured to receive a reference light; the reference light diffracts with an interference fringe saved in the photorefractive crystal, to form a reproducing light wave, that is emitted to the microlens array, of a holographic 3D image corresponding to the interference fringe; and, the microlens array is configured to receive a reproducing light wave emitted by the photorefractive crystal; the reproducing light wave passes through the array face of the microlens array, to reproduce the holographic 3D image.

Embodiments of the present application provide a holographic 3D recording device, a holographic 3D reproducing device and a holographic 3D display apparatus. The holographic 3D recording device receives a light wave emitted through a diffuse reflection of the object to be photographed through the microlens array. The microlens array comprises a plurality of micro lenses arranged in an array, then, the plurality of micro lenses can receive continuously light waves emitted through the diffuse reflection of the object to be photographed at various angles and emit them to the photorefractive crystal. As a result, information on the light waves emitted through the diffuse reflection of the object to be photographed at various angles can be obtained without rotating the photorefractive crystal, which can effectively implement a record of the holographic 3D image without the addition of any angle controller, thereby reducing complexity of the implementation of recording the holographic 3D image.

BRIEF DESCRIPTION OF THE DRAWINGS

In order to provide a more clear explanation of embodiments of the present invention or prior art solutions, there is provided a brief introduction of the attached drawings used in the following description of the embodiments and the prior art solutions. Obviously, the drawings mentioned in the following description relate to some embodiments of the present invention. However, for those skilled in the art, other drawings may be achieved on the basis of these attached drawings without involving any inventive step.

REFERENCE SIGNS

1—laser generating unit; 2—beam splitting unit; 3—photorefractive crystal; 4—microlens array; 401—plain lens; 101—object; 102—image of an object; 100—object to be photographed; 200—reference light; 201—first light of object; 202—second light of object; 203—third light of object; 5—beam expansion and collimation unit; 6—first reflecting mirror; 7—second reflecting mirror; 8—beam expansion unit; 9—focusing unit; 10—object light baffle plate; 11—third reflecting mirror; 12—half-wave plate; 13—diverging unit; 14—diffuser sheet; 15—polarization sheet.

DETAILED DESCRIPTION OF THE EMBODIMENTS

Technical solutions disclosed in the embodiments of the present application will be described hereinafter clearly and completely with reference to the attached drawings. Obviously, the embodiments illustrated in these drawings are only some of embodiments of the present application, instead of all of the embodiments of the present application. For those skilled in the art, other embodiments achieved by referring to the following embodiments without involving any inventive steps fall into the scope of the present application.

First Embodiment

Figure 1:
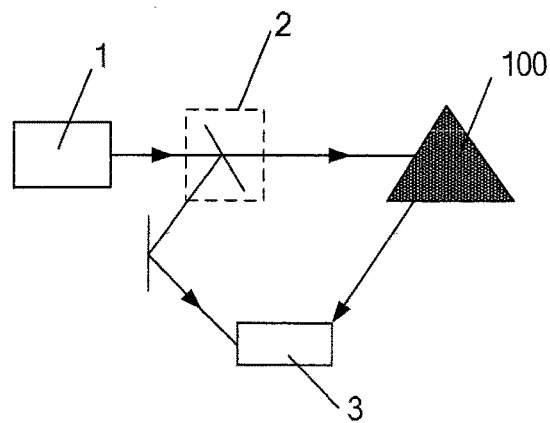
FIG. 1 is a structural schematic view showing a recording device of a holographic 3D display apparatus in prior art.
Figure 2:
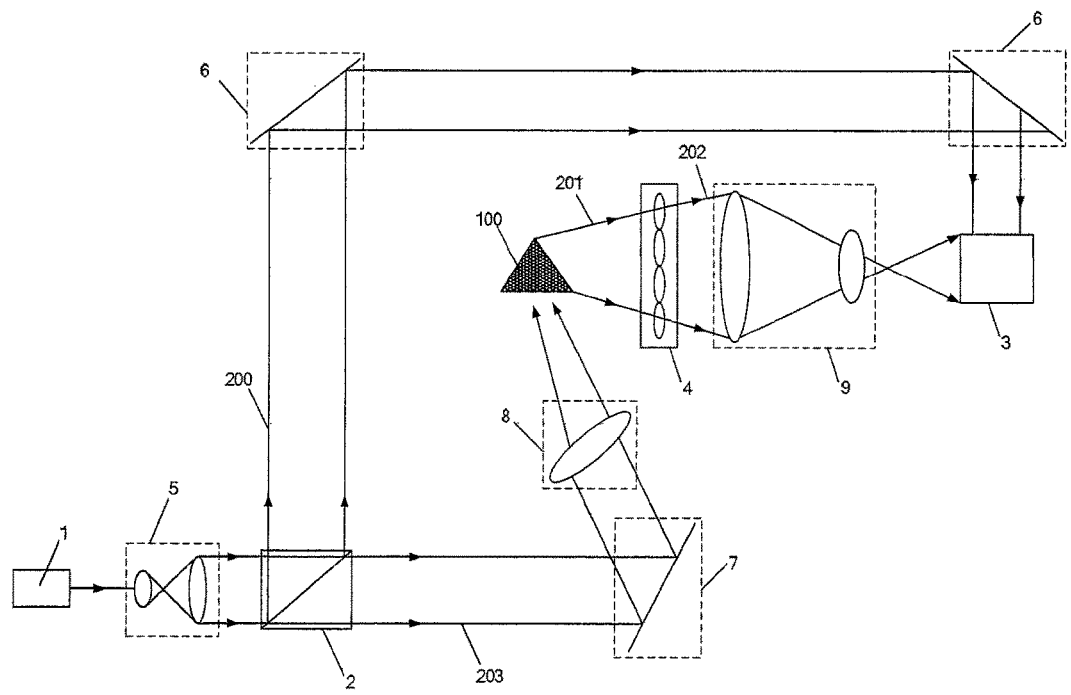
FIG. 2 is a structural schematic view showing a holographic 3D recording device according to an embodiment of the present invention.

A holographic 3D recording device is provided in accordance with this embodiment of the present application. Referring to FIG. 2, the holographic 3D recording device comprises: a photorefractive crystal 3 and a microlens array 4. The microlens array 4 comprises an array face and a side face. The microlens array 4 is provided in a light path from an object 100 to be photographed to the photorefractive crystal 3, and a first light 201 of object emitted through a diffuse reflection of the object 100 to be photographed passes through the array face of the microlens array 4 and becomes a second light 202 of object that is emitted to the photorefractive crystal 3. The photorefractive crystal 3 is configured to receive the second light 202 of object emitted from the microlens array 4 and a reference light 200, respectively, and save therein an interference fringe formed by the reference light 200 and the second light 202 of object; wherein, the first light 201 of object and the reference light 200 are coherent light.

It should be mentioned that, the microlens array usually comprises a light refraction-based refractive microlens array and a light diffraction-based diffractive microlens array. The refractive microlens array may include a plurality of plain lenses arranged in an array, and the diffractive microlens array may include a plurality of continuous relief or microstep shaped lenses. Both of the two types of microlens arrays can receive light waves emitted through the diffuse reflection of the object to be photographed at various angles and emit them to the photorefractive crystal, and there is no limitation on this herein. The refractive microlens array is taken as an example in the embodiments of the present application as well as the attached drawings, for explanatory purposes.

Figure 3:
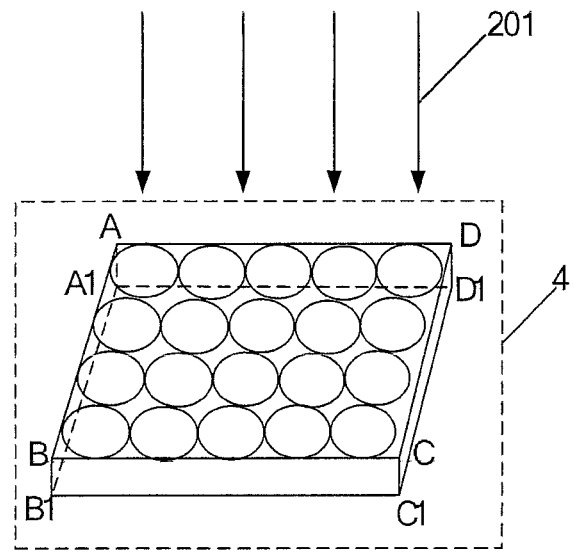
FIG. 3 is a schematic view showing emission of a first light of object to a microlens array.

In the abovementioned holographic 3D recording device, the array face indicates a face where a plurality of microlens array are arranged. Referring to FIG. 3, the microlens array 4 comprises: an array face ABCD and a side face. The first light 201 of object passes through the array face ABCD of the microlens array 4, instead of through the side face, e.g., face BB1CC1, of the microlens array 4, and emits to the photorefractive crystal.

In addition, in the embodiments of the present application, phrase "emit/emitted/emitting to A" indicates a light arrives at A, the light may arrive at A directly without passing through other optical elements, or may arrive at A finally after a further reflection, refraction, etc. by other optical elements. For example, phrase "the second light 202 of object emits to the photorefractive crystal 3" may mean that, the second light 202 of object emits directly to the photorefractive crystal 3 without passing through other optical elements, or, the second light 202 of object arrives at the photorefractive crystal 3 after being converged by a focusing unit 9, there is no limitation on this herein, and it depends on actual situations.

Figure 4:
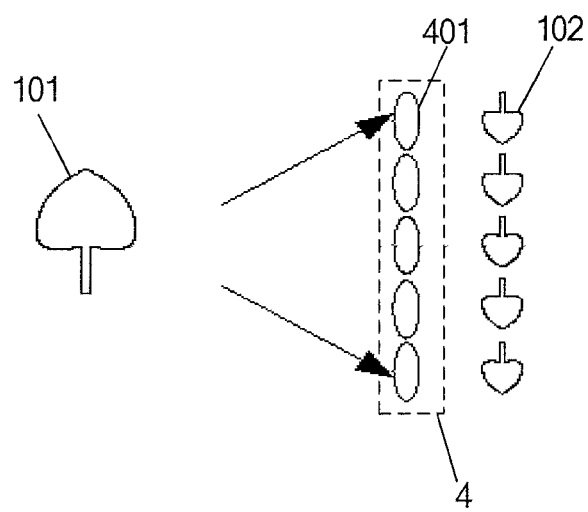
FIG. 4 is a schematic view showing a principle of imaging of the microlens array.

The following description refers to the principle of the refractive microlens array. Referring to FIG. 4, the microlens array 4 may include a plurality of plain lenses 401 arranged in an array. Light emitted through a diffuse reflection of an object 101 passes through the plain lens 401, and the plurality of plain lenses 401 can receive lights emitted through diffuse reflection of the object 101 at various angles and can form images of the object 101 at the corresponding angles. That is, the microlens array 4 can transmit continuously information on the light waves of the object at various angles.

Embodiments of the present application provide a holographic 3D recording device. The holographic 3D recording device receives a light wave emitted through the diffuse reflection of the object to be photographed through the microlens array. The microlens array comprises a plurality of micro lenses arranged in an array, and then, the plurality of micro lenses can receive continuously light waves emitted through the diffuse reflection of the object to be photographed at various angles and emit them to the photorefractive crystal. As a result, information on the light waves emitted through the diffuse reflection of the object to be photographed at various angles can be obtained without rotating the photorefractive crystal, which can effectively implement a record of the holographic 3D image without the addition of any angle controller, thereby reducing complexity of the implementation of recording the holographic 3D image.

Second Embodiment

Another holographic 3D recording device is provided in accordance with this embodiment of the present application. Referring to FIG. 2, the holographic 3D recording device comprises: a laser generating unit 1, a beam splitting unit 2, a photorefractive crystal 3 and a microlens array 4. The microlens array 4 comprises an array face and a side face. The laser generating unit 1 is configured to generate a laser beam and emit it to the beam splitting unit 2. The beam splitting unit 2 is configured to receive the laser beam emitted by the laser generating unit 1, implement a beam splitting on the laser beam to form and emit a reference light 200 and a first light 201 of object; wherein, the reference light 200 is emitted to the photorefractive crystal 3 while the first light 201 of object is emitted to the object 100 to be photographed. The microlens array 4 is provided in a light path from the object 100 to be photographed to the photorefractive crystal 3, and a first light 201 of object emitted through the diffuse reflection of the object 100 to be photographed passes through the array face of the microlens array 4 and becomes a second light 202 of object that is emitted to the photorefractive crystal 3. The photorefractive crystal 3 is configured to receive the second light 202 of object emitted from the microlens array 4 and the reference light 200, respectively, and save therein an interference fringe formed by the reference light 200 and the second light 202 of object; wherein, the first light 201 of object and the reference light 200 are coherent light.

Since the laser beam itself has a good coherence performance, the reference light 200 and the third light 203 of object formed from the implementation of a beam splitting on the laser beam by the beam splitting unit 2 have a good coherence performance. Moreover, the third light 203 of object emits to the object 100 to be photographed and thus a diffuse reflection occurs at the object to form the first light 201 of object, then, the first light 201 of object and the reference light 200 also have good coherence performance. It should be noted herein that, the beam splitting unit may be a half-reflecting and half-transmitting mirror which is able to split, according to a certain proportion, an incident light into a reflected light and a transmitted light with a certain angle therebetween. In this embodiment, a half-reflecting and half-transmitting mirror is used to split, according to a proportion of 1:1, the laser beam into the reference light and the third light of object; here, the reference light is a reflected light and the third light of object is a transmitted light. Of course, the beam splitting unit may be other optical element only if it is able to implement a beam splitting on the laser beam, and there is no limitation on this in embodiments of the present application.

It should be further noted that, the laser generating unit may be a laser or else other device which is able to generate and emit a laser beam, and there is no particular limitation on this herein.

Since the laser beam is narrower, beam expansion and collimation will be implemented to improve utilization rate of the laser beam. Preferably, referring to FIG. 2, the abovementioned recording device further comprises: a beam expansion and collimation unit 5 provided in a light path from the laser generating unit 1 to the beam splitting unit 2 and configured to receive the laser beam emitted by the laser generating unit 1 and emit, after implementing beam expansion and collimation on the laser beam emitted by the laser generating unit 1, the laser beam to the beam splitting unit 2. It should be mentioned that, the beam expansion and collimation unit 5 may be formed of two lenses shown in FIG. 2, or may be formed of other optics, as long as it can implement the beam expansion and collimation on the laser beam emitted by the laser generating unit 1, and there is no particular limitation on this herein.

Embodiments of the present application provide a holographic 3D recording device. The holographic 3D recording device receives a light wave emitted through a diffuse reflection of the object to be photographed through the microlens array. The microlens array comprises a plurality of micro lenses arranged in an array, and then, the plurality of micro lenses can receive continuously light waves emitted through the diffuse reflection of the object to be photographed at various angles and emit them to the photorefractive crystal. As a result, information on the light waves emitted through the diffuse reflection of the object to be photographed at various angles can be obtained without rotating the photorefractive crystal, which can effectively implement a record of the holographic 3D image without the addition of any angle controller, thereby reducing complexity of the implementation of recording the holographic 3D image.

In some embodiments, referring to FIG. 2, the recording device further comprises a first reflecting mirror 6 provided in a light path from the beam splitting unit 2 to the photorefractive crystal 3 and configured to reflect the reference light emitted by the beam splitting unit 2 to the photorefractive crystal 3. In this way, the space can be used effectively and locations of the beam splitting unit and the photorefractive crystal can be designed with good flexibility. It should be mentioned that, there are no limitations on numbers and locations of the first reflecting mirror herein. There may be two first reflecting mirrors as shown in FIG. 2, or other number of first reflecting mirrors may be provided, which depends on the relatively positional relationship of the beam splitting unit and the photorefractive crystal in practice.

In some embodiments, spatial locations of the beam splitting unit 2 and the photorefractive crystal 3 are shown in FIG. 2, and the holographic 3D recording device further comprises a second reflecting mirror 7 provided in a light path from the beam splitting unit 2 to the object 100 to be photographed and configured to reflect the third light 203 of object emitted by the beam splitting unit 2 to the object 100 to be photographed. In this way, the space can be used effectively and locations of the beam splitting unit and the photorefractive crystal can be designed with good flexibility.

Moreover, referring to FIG. 2, the abovementioned recording device further comprises a beam expansion unit 8 provided in a light path from the reflecting mirror 7 to the object 100 to be photographed and configured to implement a beam expansion on the third light 203 of object reflected by the second reflecting mirror 7, improving utilization rate of the third light 203 of object. It should be mentioned that, the beam expansion unit 8 may be formed of the lenses shown in FIG. 2, or may be formed of other optics, as long as it can implement a beam expansion on the third light 203 of object emitted by the second reflecting mirror 7, and there is no particular limitation on this herein.

It is difficult for photorefractive crystal in prior art to have a large size due to limitations in technology, the size of the photorefractive crystal is usually less than the size of the microlens array. In the case that an area of a light receiving face of the photorefractive crystal is less than an area of the array face of the microlens array, in order to emit to the greatest extent a second light of object emitted by the microlens array to the photorefractive crystal, more preferably, the abovementioned recording device further comprises a focusing unit 9 provided in a light path from the microlens array 4 to the photorefractive crystal 3 and configured to converge the second light 202 of object emitted by the microlens array 4 onto the photorefractive crystal 3. Of course, the size of the photorefractive crystal can also be greater than the size of the microlens array, as a result, an optical unit having a divergence effect needs to be provided in the light path from the microlens array to the photorefractive crystal.

Moreover, an object light path from the beam splitting unit to the photorefractive crystal is the same as the reference light path. As a result, the interference fringe formed by the object light and the reference light has an improved effect, reproducing the object more realistically.

Figure 5:
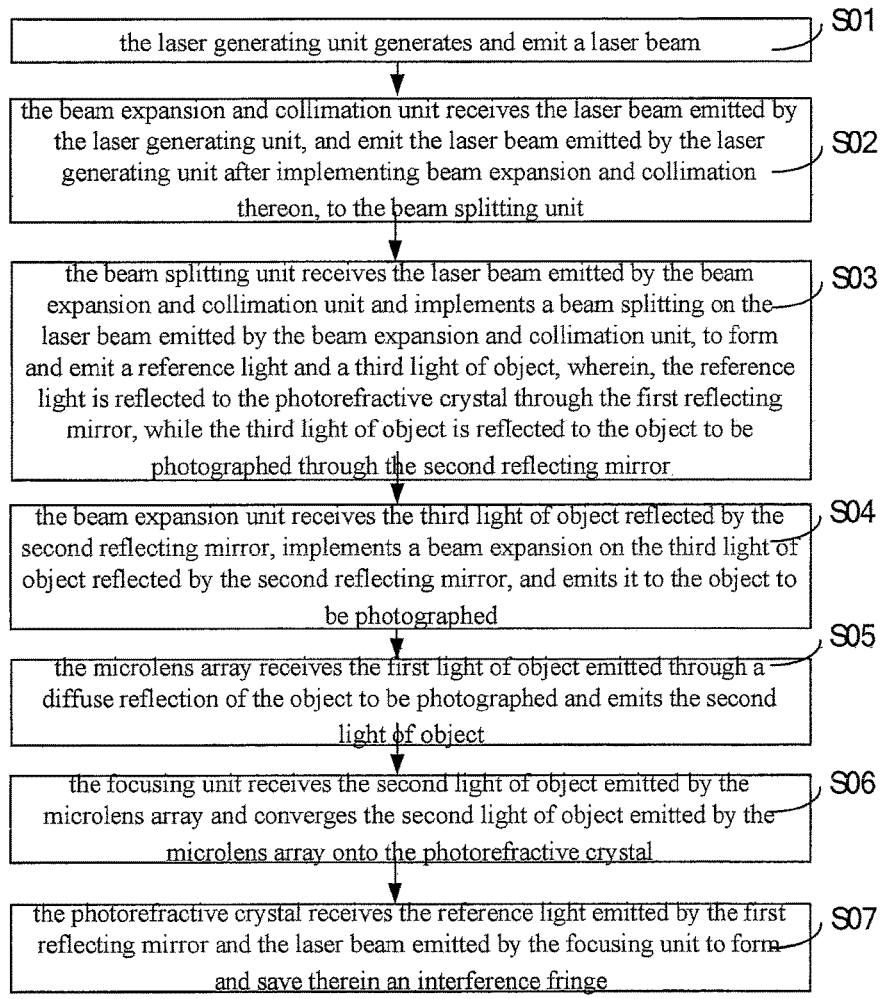
FIG. 5 is a schematic view showing a light path of a holographic 3D recording device according to an embodiment of the present invention.

A light path diagram of a holographic 3D recording device according to embodiments of the present application will be explained in detail hereafter by taking the holographic 3D recording device shown in FIG. 2 as an example. Referring to FIG. 5, the following steps may be implemented along the light path.

In a step S01, the laser generating unit 1 generates and emit a laser beam.

In a step S02, the beam expansion and collimation unit 5 receives the laser beam emitted by the laser generating unit 1, and emit the laser beam emitted by the laser generating unit 1 after implementing beam expansion and collimation thereon, to the beam splitting unit 2.

In a step S03, the beam splitting unit 2 receives the laser beam emitted by the beam expansion and collimation unit 5 and implements a beam splitting on the laser beam emitted by the beam expansion and collimation unit 5, to form and emit a reference light 200 and a third light 203 of object, wherein, the reference light 200 is reflected to the photorefractive crystal 3 through the first reflecting mirror 6, while the third light 203 of object is reflected to the object 100 to be photographed through the second reflecting mirror 7.

In a step S04, the beam expansion unit 8 receives the third light 203 of object reflected by the second reflecting mirror 7, implements a beam expansion on the third light 203 of object reflected by the second reflecting mirror 7, and emits it to the object 100 to be photographed.

In a step S05, the microlens array 4 receives the first light 201 of object emitted through a diffuse reflection of the object 100 to be photographed and emits the second light 202 of object.

In a step S06, the focusing unit 9 receives the second light 202 of object emitted by the microlens array 4 and converges the second light 202 of object emitted by the microlens array 4 onto the photorefractive crystal 3.

In a step S07, the photorefractive crystal 3 receives the reference light beam 200 emitted by the first reflecting mirror 6 and the laser beam emitted by the focusing unit 9 to form and save therein an interference fringe.

Third Embodiment

Figure 6:
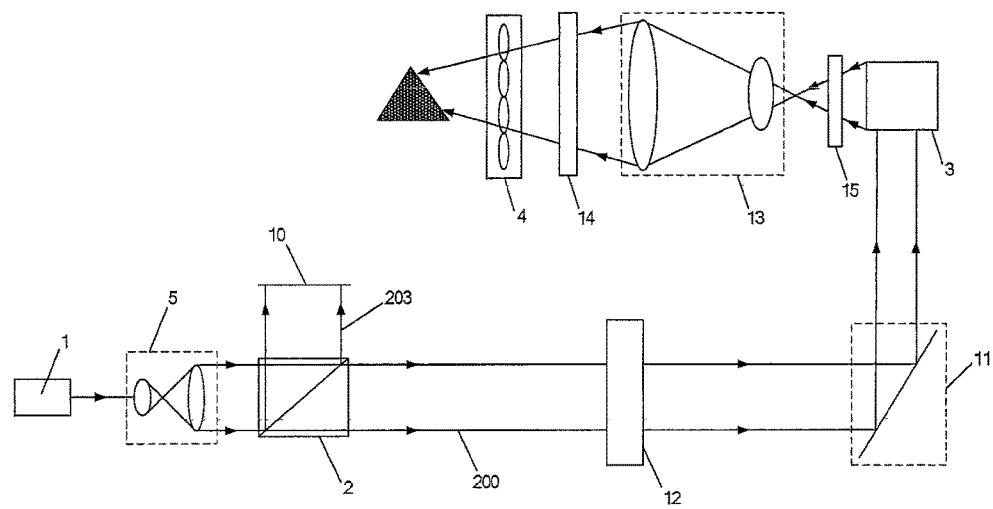
FIG. 6 is a structural schematic view showing a holographic 3D reproducing device according to an embodiment of the present invention.

A holographic 3D reproducing device is provided in accordance with this embodiment of the present application. Referring to FIG. 6, the holographic 3D reproducing device comprises: a photorefractive crystal 3 and a microlens array 4. The microlens array 4 comprises an array face and a side face. The photorefractive crystal 3 is configured to receive a reference light 200; the reference light 200 diffracts with an interference fringe saved in the photorefractive crystal 3, to form a reproducing light wave, that is emitted to the microlens array 4, of a holographic 3D image corresponding to the interference fringe. The microlens array 4 is configured to receive the reproducing light wave emitted by the photorefractive crystal 3; the reproducing light wave passes through the array face of the microlens array 4, so as to reproduce the holographic 3D image.

It should be noted that, the abovementioned holographic 3D reproducing device may be made based on the holographic 3D recording device according to the first embodiment, or may be made alone, and there is no particular limitation herein. However, the former is generally adopted when taking the cost and stability of the light path into consideration.

In the abovementioned reproducing device, the array face indicates a face where a plurality of microlens array are arranged. Referring to FIG. 3, the microlens array 4 comprises: an array face ABCD and a side face. The reproducing light wave passes through the array face ABCD of the microlens array 4, instead of passing through the side face, e.g., face BB1CC1, of the microlens array 4, thereby reproducing the holographic 3D image.

Embodiments of the present application provide a holographic 3D reproducing device. The holographic 3D reproducing device receives a reproducing light wave emitted by the photorefractive crystal through the microlens array. The microlens array comprises a plurality of micro lenses arranged in an array, which can receive continuously reproducing light waves emitted from the photorefractive crystal at various angles and converge the reproducing light waves to form a holographic 3D image to be reproduced. As a result, information on the light waves at various angles can be displayed after being superposed without rotating the photorefractive crystal, which can implement reproduction of the holographic 3D image without the addition of any angle controller, thereby reducing complexity of the implementation of reproducing the holographic 3D image.

Fourth Embodiment

A holographic 3D reproducing device is also provided in accordance with this embodiment of the present application. Referring to FIG. 6, the holographic 3D reproducing device comprises: a laser generating unit 1, a beam splitting unit 2, a photorefractive crystal 3 and a microlens array 4. The microlens array 4 comprises an array face and a side face. The laser generating unit 1 is configured to generate a laser beam and emit it to the beam splitting unit 2. The beam splitting unit 2 is configured to implement a beam splitting on the laser beam to form and emit a reference light 200 and a third light 203 of object, wherein, the reference light 200 is emitted to the photorefractive crystal 3. The photorefractive crystal 3 is configured to receive the reference light 200; the reference light 200 diffracts with an interference fringe saved in the photorefractive crystal 3, to form a reproducing light wave, that is emitted to the microlens array 4, of a holographic 3D image corresponding to the interference fringe. The microlens array 4 is configured to receive the reproducing light wave emitted by the photorefractive crystal 3; the reproducing light wave passes through the array face of the microlens array 4, so as to reproduce the holographic 3D image.

It should be noted herein that, the beam splitting unit may be a half-reflecting and half transmitting mirror which is able to split, according to a certain proportion, an incident light into a reflected light and a transmitted light at a certain angle. In this embodiment, a reflecting-transmitting mirror is used to split, according to a proportion of 1:1, the laser beam into the reference light and the third light of object; here, the reference light is a reflected light and the third light of object is a transmitted light. Of course, the beam splitting unit may be other optical element only if it is able to implement a beam splitting on the laser beam, and there is no limitation on this in embodiments of the present application. In addition, the laser generating unit may be a laser or else other device which is able to generate and emit a laser beam, and there is no particular limitation on this herein.

Embodiments of the present application provide a holographic 3D reproducing device. The holographic 3D reproducing device receives a reproducing light wave emitted by the photorefractive crystal through the microlens array. The microlens array comprises a plurality of micro lenses arranged in an array, which can receive continuously reproducing light waves emitted from the photorefractive crystal at various angles and converge the reproducing light waves to form a holographic 3D image to be reproduced. As a result, information on the light waves at various angles can be displayed after being superposed without rotating the photorefractive crystal, which can implement reproduction of the holographic 3D image without the addition of any angle controller, thereby reducing complexity of the implementation of reproducing the holographic 3D image.

In some embodiments, in order to avoid interference of the third light 203 of object with the reproducing light path, referring to FIG. 6, the holographic 3D recording device further comprises an object light baffle plate 10 provided in a light outgoing path of the third light 203 of object and configured to shield the third light 203 of object.

Since the laser beam is narrower, beam expansion and collimation may be implemented to improve utilization rate of the laser beam. Preferably, referring to FIG. 6, the abovementioned reproducing device further comprises: a beam expansion and collimation unit 5 provided in a light path from the laser generating unit 1 to the beam splitting unit 2 and configured to receive the laser beam emitted by the laser generating unit 1 and emit, after implementing a beam expansion and collimation on the laser beam emitted by the laser generating unit 1, the laser beam to the beam splitting unit 2. It should be mentioned that, the beam expansion and collimation unit 5 may be formed of two lenses as shown in FIG. 6, or may be formed of other optics, as long as it can implement beam expansion and collimation on the laser beam emitted by the laser generating unit 1, and there is no particular limitation on this herein.

In some embodiments, referring to FIG. 6, the abovementioned reproducing device further comprises: a third reflecting mirror 11 provided in a light path from the beam splitting unit 2 to the photorefractive crystal 3 and configured to reflect the reference light emitted by the beam splitting unit 2 to the photorefractive crystal 3. In this way, the space can be used effectively and locations of the beam splitting unit and the photorefractive crystal can be designed with good flexibility.

In some embodiments, referring to FIG. 6, the abovementioned reproducing device further comprises: a half-wave plate 12 provided in a light path from the beam splitting unit 2 to the photorefractive crystal 12 and configured to receive the reference light 200 emitted by the beam splitting unit 2 and convert the reference light 200 emitted by the beam splitting unit 2 into a phase conjugated light beam, and emit the phase conjugated light beam to the photorefractive crystal 3. propagation direction and location of the phase conjugated light beam can be restricted, thereby improving a visual angle of reproducing a 3D image.

It is difficult for the photorefractive crystal in prior art to have a large size due to limitations in technology, the size of the photorefractive crystal is usually less than the size of the microlens array. In the case that an area of a light outgoing face of the photorefractive crystal is less than an area of the array face of the microlens array, in order to emit to the greatest extent a reproducing light wave emitted by the photorefractive crystal to the microlens array, referring to FIG. 6, the abovementioned recording device further comprises a diverging unit 13 provided in a light path from the photorefractive crystal 3 to the microlens array 4 and configured to receive the reproducing light wave emitted by the photorefractive crystal 3 and diverge the reproducing light wave emitted by the photorefractive crystal 3 onto the microlens array 4.

In some embodiments, referring to FIG. 6, the abovementioned reproducing device further comprises: a diffuser sheet 14 provided in a light path from the diverging unit 13 to the microlens array 4 and configured to receive a light wave emitted by the diverging unit 13 and emit the light wave emitted by the diverging unit 13 to the microlens array 4. In this way, noise of the reproducing light wave can be reduced to reproduce a more clear 3D image.

In some embodiments, referring to FIG. 6, the abovementioned reproducing device further comprises: a polarization sheet 15 provided in a light path from the photorefractive crystal 3 to the diverging unit 13 and configured to receive the reproducing light wave emitted by the photorefractive crystal 3 and emit the reproducing light wave emitted by the photorefractive crystal 3 to the diverging unit 13. In this way, noise of the reproducing light wave can be further reduced to reproduce a more clear 3D image.

Figure 7:
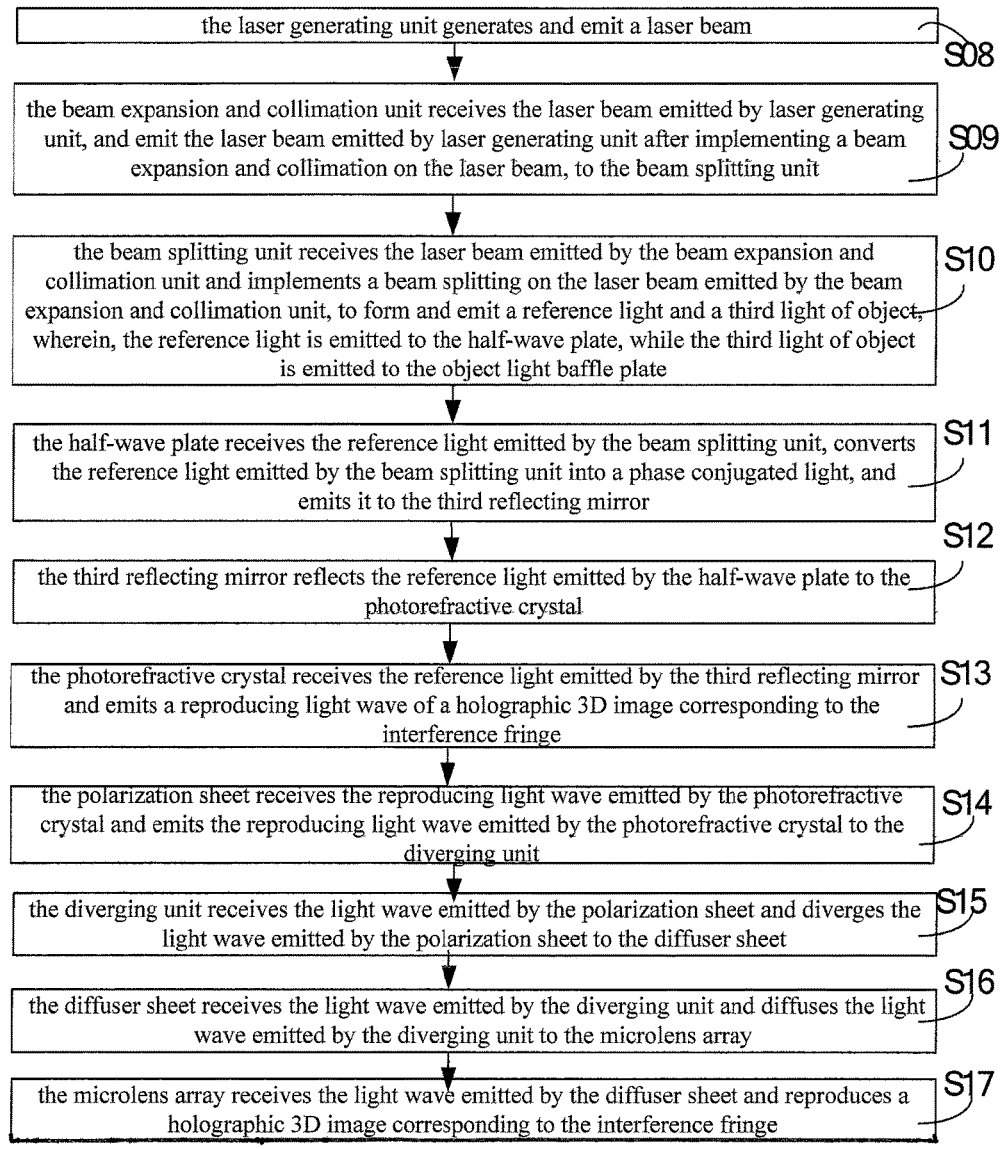
FIG. 7 is a schematic view showing a light path of a holographic 3D reproducing device according to an embodiment of the present invention.

A light path diagram of a holographic 3D reproducing device according to embodiments of the present application will be explained in detail hereafter by taking the holographic 3D reproducing device shown in FIG. 6 as an example. Referring to FIG. 7, the following steps may be implemented or occur along the light path.

In a step S08, the laser generating unit 1 generates and emit a laser beam.

In a step S09, the beam expansion and collimation unit 5 receives the laser beam emitted by the laser generating unit 1, and emit the laser beam emitted by the laser generating unit 1 after implementing a beam expansion and collimation on the laser beam, to the beam splitting unit 2.

In a step S10, the beam splitting unit 2 receives the laser beam emitted by the beam expansion and collimation unit 5 and implements a beam splitting on the laser beam emitted by the beam expansion and collimation unit 5, to form and emit a reference light 200 and a third light 203 of object, wherein, the reference light 200 is emitted to the half-wave plate 13, while the third light 203 of object is emitted to the object light baffle plate 10.

In a step S11, the half-wave plate 12 receives the reference light 200 emitted by the beam splitting unit 2, converts the reference light 200 emitted by the beam splitting unit 2 into a phase conjugated light, and emits it to the third reflecting mirror 11.

In a step S12, the third reflecting mirror 11 reflects the reference light 200 emitted by the half-wave plate 12 to the photorefractive crystal 3.

In a step S13, the photorefractive crystal 3 receives the reference light 200 emitted by the third reflecting mirror 11 and emits a reproducing light wave of a holographic 3D image corresponding to the interference fringe.

In a step S14, the polarization sheet 15 receives the reproducing light wave emitted by the photorefractive crystal 3 and emits the reproducing light wave emitted by the photorefractive crystal 3 to the diverging unit 13.

In a step S15, the diverging unit 13 receives the light wave emitted by the polarization sheet 15 and diverges the light wave emitted by the polarization sheet 15 to the diffuser sheet 14.

In a step S16, the diffuser sheet 14 receives the light wave emitted by the diverging unit 13 and diffuses the light wave emitted by the diverging unit 13 to the microlens array 4.

In a step S17, the microlens array 4 receives the light wave emitted by the diffuser sheet 14 and reproduces a holographic 3D image corresponding to the interference fringe.

Fifth Embodiment

This embodiment of the present application provides a holographic 3D display apparatus comprising a photorefractive crystal and a microlens array.

In the case that the display apparatus is used for implementing a holographic 3D record, the microlens array is provided in a light path from an object to be photographed to the photorefractive crystal, and a first light of object emitted through a diffuse reflection of the object to be photographed passes through the array face of the microlens array and becomes a second light of object that is emitted to the photorefractive crystal; the photorefractive crystal is configured to receive the second light of object emitted by the microlens array and a reference light, respectively, and save therein an interference fringe formed by the reference light and the second light of object; and, the first light of object and the reference light are coherent light. The particular implementation of the device may refer to those described in first embodiment and second embodiment and it will not be described repeatedly herein.

In the case that the display apparatus is used for implementing a holographic 3D reproduction, the photorefractive crystal is configured to receive a reference light; the reference light diffracts with an interference fringe saved in the photorefractive crystal, to form a reproducing light wave, that is emitted to the microlens array, of a holographic 3D image and corresponding to the interference fringe; and, the microlens array is configured to receive the reproducing light wave emitted by the photorefractive crystal; the reproducing light wave passes through the array face of the microlens array to reproduce the holographic 3D image. The particular implementation of the device may refer to those described in third embodiment and fourth embodiment and it will not be described repeatedly herein.

This holographic 3D display apparatus can achieve implementations of recording and reproducing a holographic 3D image without addition of any angle controller, which reduces complexity of the implementation of recording and reproducing the holographic 3D image.

The above description is merely used to illustrate exemplary embodiments of the present application, but not to limit the present application. It should be understood by those skilled in the art that, all of changes and modifications made easily within principles and spirit of the present application should be included within the scope of the present application. Therefore, the scope of the present application is defined in the claims of the present application.

What is claimed is:

1. A holographic 3D recording device, comprising: a photorefractive crystal and a microlens array, wherein
   the microlens array comprises an array face and a side face;
   the microlens array is provided in a light path from an object to be photographed to the photorefractive crystal, such that first light of object emitted through a diffuse reflection of the object to be photographed passes through the array face of the microlens array and becomes second light of object that is emitted to the photorefractive crystal; and
   the photorefractive crystal is configured to receive the second light of object emitted by the microlens array and reference light respectively, and save therein an interference fringe formed by the reference light and the second light of object;
   the first light of object and the reference light are coherent light.

2. The holographic 3D recording device of claim 1, wherein, an area of a light receiving face of the photorefractive crystal is less than an area of the array face of the microlens array.

3. The holographic 3D recording device of claim 2, further comprising a focusing unit provided in a light path from the microlens array to the photorefractive crystal and configured to receive the second light of object emitted by the microlens array and converge the second light of object emitted by the microlens array onto the photorefractive crystal.

4. The holographic 3D recording device of claim 1, further comprising a beam splitting unit configured to implement a beam splitting on a laser beam to form and emit the reference light and third light of object; wherein, the reference light is emitted to the photorefractive crystal while the third light of object is emitted to the object to be photographed.

5. The holographic 3D recording device of claim 4, further comprising a laser generating unit configured to generate the laser beam and emit the laser beam to the beam splitting unit.

6. The holographic 3D recording device of claim 5, further comprising a beam expansion and collimation unit provided in a light path from the laser generating unit to the beam splitting unit and configured to receive the laser beam emitted by the laser generating unit and emit, after implementing beam expansion and collimation on the laser beam emitted by the laser generating unit, the laser beam to the beam splitting unit.

7. The holographic 3D recording device of claim 6, further comprising a first reflecting mirror provided in a light path from the beam splitting unit to the photorefractive crystal and configured to reflect the reference light emitted by the beam splitting unit to the photorefractive crystal.

8. The holographic 3D recording device of claim 7, further comprising a second reflecting mirror provided in a light path from the beam splitting unit to the object to be photographed and configured to reflect the third light of object emitted by the beam splitting unit to the object to be photographed.

9. A holographic 3D reproducing device, comprising a photorefractive crystal and a microlens array, wherein
the microlens array comprises an array face and a side face;
the photorefractive crystal is configured to receive reference light such that the reference light diffracts with an interference fringe saved in the photorefractive crystal to form a reproducing light wave, that is emitted to the microlens array, of a holographic 3D image corresponding to the interference fringe, wherein, an area of a light outgoing face of the photorefractive crystal is less than an area of the array face of the microlens array; and
the microlens array is configured to receive the reproducing light wave emitted by the photorefractive crystal such that the reproducing light wave passes through the array face of the microlens array to reproduce the holographic 3D image.

10. The holographic 3D reproducing device of claim 9, further comprising a beam splitting unit configured to implement a beam splitting on a laser beam to form and emit reference light and third light of object; wherein, the reference light is emitted to the photorefractive crystal.

11. The holographic 3D reproducing device of claim 10, further comprising a laser generating unit configured to generate the laser beam and emit the laser beam to the beam splitting unit.

12. The holographic 3D reproducing device of claim 11, further comprising a beam expansion and collimation unit provided in a light path from the laser generating unit to the beam splitting unit and configured to receive the laser beam emitted by the laser generating unit and emit, after implementing beam expansion and collimation on the laser beam emitted by the laser generating unit, the laser beam to the beam splitting unit.

13. The holographic 3D reproducing device of claim 10, further comprising a half-wave plate provided in a light path from the beam splitting unit to the photorefractive crystal and configured to receive the reference light emitted by the beam splitting unit, convert the reference light emitted by the beam splitting unit into phase conjugated light, and emit the phase conjugated light to the photorefractive crystal.

14. The holographic 3D recording device of claim 13, further comprising a diverging unit provided in a light path from the photorefractive crystal to the microlens array and configured to receive the reproducing light wave emitted by the photorefractive crystal and diverge the reproducing light wave emitted by the photorefractive crystal onto the microlens array.

15. The holographic 3D recording device of claim 14, further comprising an object light baffle plate provided in a light outgoing path of the third light of object and configured to shield the third light of object.

16. The holographic 3D recording device of claim 15, further comprising a third reflecting mirror provided in the light path from the beam splitting unit to the photorefractive crystal and configured to reflect the reference light emitted by the beam splitting unit to the photorefractive crystal.

17. The holographic 3D recording device of claim 16, further comprising a diffuser sheet provided in a light path from the diverging unit to the microlens array and configured to receive the light wave emitted by the diverging unit and emit the light wave emitted by the diverging unit to the microlens array.

18. The holographic 3D recording device of claim 17, further comprising a polarization sheet provided in a light path from the photorefractive crystal to the diverging unit and configured to receive the reproducing light wave emitted by the photorefractive crystal and emit the reproducing light wave emitted by the photorefractive crystal to the diverging unit.

19. A holographic 3D display apparatus, comprising: a photorefractive crystal and a microlens array; wherein
the microlens array comprises an array face and a side face;
in the case that the display apparatus is used for implementing a holographic 3D record, the microlens array is provided in a light path from an object to be photographed to the photorefractive crystal such that first light of object emitted through diffuse reflection of the object to be photographed passes through the array face of the microlens array and becomes second light of object that is emitted to the photorefractive crystal; the photorefractive crystal is configured to receive the second light of object emitted by the microlens array and reference light respectively, and save therein an interference fringe formed by the reference light and the second light of object; and the first light of object and the reference light are coherent light; and
in the case that the display apparatus is used for implementing a holographic 3D reproduction, the photorefractive crystal is configured to receive reference light such that the reference light diffracts with an interference fringe saved in the photorefractive crystalto form a reproducing light wave, that is emitted to the microlens array, of a holographic 3D image corresponding to the interference fringe; and, the microlens array is configured to receive a reproducing light wave emitted by the photorefractive crystal such that the reproducing light wave passes through the array face of the microlens array to reproduce the holographic 3D image.

* * * * *